United States Patent

Kokubo et al.

[11] Patent Number: 5,953,497
[45] Date of Patent: Sep. 14, 1999

[54] SCANNING TYPE IMAGE FORMING DEVICE CAPABLE OF PRINTING IMAGES DEPENDING ON SCANNING SPEED

[75] Inventors: Masatoshi Kokubo, Ama-gun; Naohisa Kinoshita, Nagoya, both of Japan

[73] Assignee: Brother Kogyo Kabushiki Kaisha, Nagoya, Japan

[21] Appl. No.: 08/838,050

[22] Filed: Apr. 22, 1997

[30] Foreign Application Priority Data

Apr. 23, 1996 [JP] Japan .................................... 8-101314
May 14, 1996 [JP] Japan .................................... 8-118797

[51] Int. Cl.$^6$ ............................ B41B 15/00; H04N 1/024; B41J 3/36
[52] U.S. Cl. ......................... 395/109; 358/472; 358/473; 347/109
[58] Field of Search .................................... 395/105, 109, 395/113; 358/486, 472, 473, 412, 409; 347/109, 14, 19; 400/120.09, 88

[56] References Cited

U.S. PATENT DOCUMENTS 4,851,921  7/1989  Sato et al. ............................. 358/474
5,112,149  5/1992  Suenaga ................................. 400/88
5,593,236  1/1997  Bobry .................................... 400/88

FOREIGN PATENT DOCUMENTS 48-17630   6/1973   Japan .
62-292062  12/1987  Japan .
1 366 253  9/1974   United Kingdom .

Primary Examiner—Edward L. Coles
Assistant Examiner—Ephrem Alemu
Attorney, Agent, or Firm—McGinn & Gibb, P.C.

[57] ABSTRACT

An image forming device includes: a recording unit which prints an image on a recording medium; a memory unit which stores image information for pixels forming the image; a speed detection unit which detects movement speed of the recording unit; a speed comparison unit which compares the movement speed detected by the speed detection unit with a preset reference speed to determine whether the movement speed is faster or slower than the reference speed; and a control unit which controls drive of the recording unit in synchronization with the movement speed detected by the speed detection unit to print the image based on the image information stored in the memory unit and which performs processes so that the recording unit prints the image in a density dependent on whether the speed comparison unit determines that the movement speed is faster or slower than the reference speed.

24 Claims, 12 Drawing Sheets

SCANNING TYPE IMAGE FORMING DEVICE CAPABLE OF PRINTING IMAGES DEPENDING ON SCANNING SPEED

BACKGROUND OF THE INVENTION

1. Field of the Invention

The present invention relates to an image forming device wherein printing is performed by scanning the device across a recording medium.

2. Description of the Related Art

British Patent Specification 1 366 253 describes a conventional manual image forming device with a displacement detection unit for detecting relative positional change between a print head of the device and a recording medium in order to determine the scanning speed of the manual image forming device across the recording medium. In order to detect relative positional change generated by the print head moving across the recording medium, the detection unit has a roller which moves in correspondence with movement of the print head by rotating in contact with the surface of the recording medium. The detection unit detects rotational angle of the roller to determine relative positional change between the print head and the recording medium and, consequently, the position of the print head.

In this way, even when the scanning speed is not uniform, the conventional image forming device can perform excellent printing by using the displacement detection unit to detect relative positional change between the print head and the recording medium and, at the same time, controlling the print head based on the detected results. Further, the image forming device having the above-described configuration can easily print on any position of the recording medium and can print on a variety of recording media, such as on thick prebound books or documents, or large-sized sheets.

However, because this type of image forming device is configured so as to be manually scanned, the user may scan the device too quickly so that the maximum drive frequency of the print head is exceeded. In this case, the print head can not be driven rapidly enough to keep up with the scanning speed of the device so that the resultant printed image has poor quality. In order to solve this problem, U.S. Pat. No. 4,851,921 discloses a device wherein an alarm rings to warn a user when the present scanning speed exceeds a preset speed. Printing can be properly performed using the device of U.S. Pat. No. 4,851,921, as long as the user scans the device at a speed within a range where the alarm does not ring.

SUMMARY OF THE INVENTION

However, printing performed using the device of U.S. Pat. No. 4,851,921 will be as poor as with the device of British Patent Specification 1 366 253 when the user ignores the alarm and continues to scan the device. In other words, the frequency of poor printing can be slightly reduced but can not be completely eliminated.

Also, if an alarm is used to warn the user that he or she is scanning the device over the predetermined speed, the alarm may annoy nearby people, rendering the image forming device inappropriate for crowded situations such as conventions. On the other hand, if a visual alarm, such as a light unit, is used, the user may not notice the warning light. Further, when the warning is given, the user has to stop printing and start all over again, which is troublesome for the user.

Also, in order for a user to print emboldened text using the conventional image forming devices described above, image data for thick characters had to be specially prepared, thereby increasing the overall amount of data needed to be processed.

Although it is conceivable to print dense or bold images by printing the pixels that form the image twice so as to overlap each other, in this conceivable device, a switch and the like must be provided for switching the device between normal printing and overlap printing. However, it is difficult to position such a switch in a compact-sized device, such as a manual image forming device.

It is an objective of the present invention to overcome the above-described problems and to provide an image forming device capable of printing thick or bold images without increasing image data and without providing a special switch. It is another objective of the present invention to provide an image forming device enabling a user to continue printing and which produces excellent print quality, even though the device is scanned over a predetermined speed.

In order to achieve the above-described objectives, an image forming device according to the present invention includes: a recording unit which prints an image on a recording medium; a memory unit which stores image information for pixels forming the image; a speed detection unit which detects movement speed of the recording unit; a speed comparison unit which compares the movement speed detected by the speed detection unit with a preset reference speed to determine whether the movement speed is faster or slower than the reference speed: and a control unit which controls drive of the recording unit in synchronization with the movement speed detected by the speed detection unit to print the image based on the image information stored in the memory unit and which performs processes so that the recording unit prints the image in a density dependent on whether the speed comparison unit determines that the movement speed is faster or slower than the reference speed.

Said differently, the control portion controls the recording unit to print the image in a density dependent on whether the speed comparison unit determines that the movement speed of the device is faster or slower than the reference speed. With this configuration, proper printing can be easily performed without interruption even when the scanning speed of the image forming device exceeds the reference speed.

According to another aspect of the present invention, the reference speed is set to equal to or less than a maximum drive frequency of the recording unit. With this configuration, proper printing can be easily performed without interruption even when the scanning speed exceeds the drive frequency of the print unit.

According to another aspect of the present invention, the speed comparison unit compares the movement speed with a plurality of different reference speeds: and the control unit thins the image information at a ratio depending on results of the comparison unit comparing the movement speed with the plurality of reference speeds. With this configuration, processes corresponding to a plurality of scanning speeds can be executed and proper printing can be performed corresponding to a wide range of printing speeds.

According to another aspect of the present invention, the image forming device further includes a reference speed setting unit for optionally setting the reference speeds used by the speed comparison unit. With this configuration, by merely changing the scanning speed, the print mode can be switched between: a normal mode wherein normal printing is performed while the scanning speed is slower than the reference speed; and a draft mode wherein less dense printing is performed while the scanning speed is faster than the reference speed.

According to still another aspect of the present invention, the control unit controls the recording unit to print the image denser, either by printing each pixel twice or by ejecting large volume droplets, when the comparison unit determines the movement speed to be slower than the reference speed than when the comparison unit determines the movement speed to be faster than the reference speed.

According to still another aspect of the present invention, the speed comparison unit compares the movement speed detected by the speed detection unit with a first and a second reference speeds, the first reference speed being faster than the second reference speed, and the control unit: when the speed comparison unit determines that the movement speed is faster than the first reference speed, thins the image information stored in the memory unit before controlling drive of the recording unit to print the image information; when the speed comparison unit determines that the movement speed is slower than the first reference speed and faster than the second reference speed, controls drive of the recording unit to print the image information without thinning the image information; and when the speed comparison unit determines that the movement speed is slower than the second reference speed, controls the recording unit to print the image denser than when the speed comparison unit determines that the movement speed is slower than the first reference speed and faster than the second reference speed.

With this configuration, the user can select between the draft mode, the normal print mode, and the bold print mode merely by changing speed at which he or she scans the image forming device across the recording medium.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
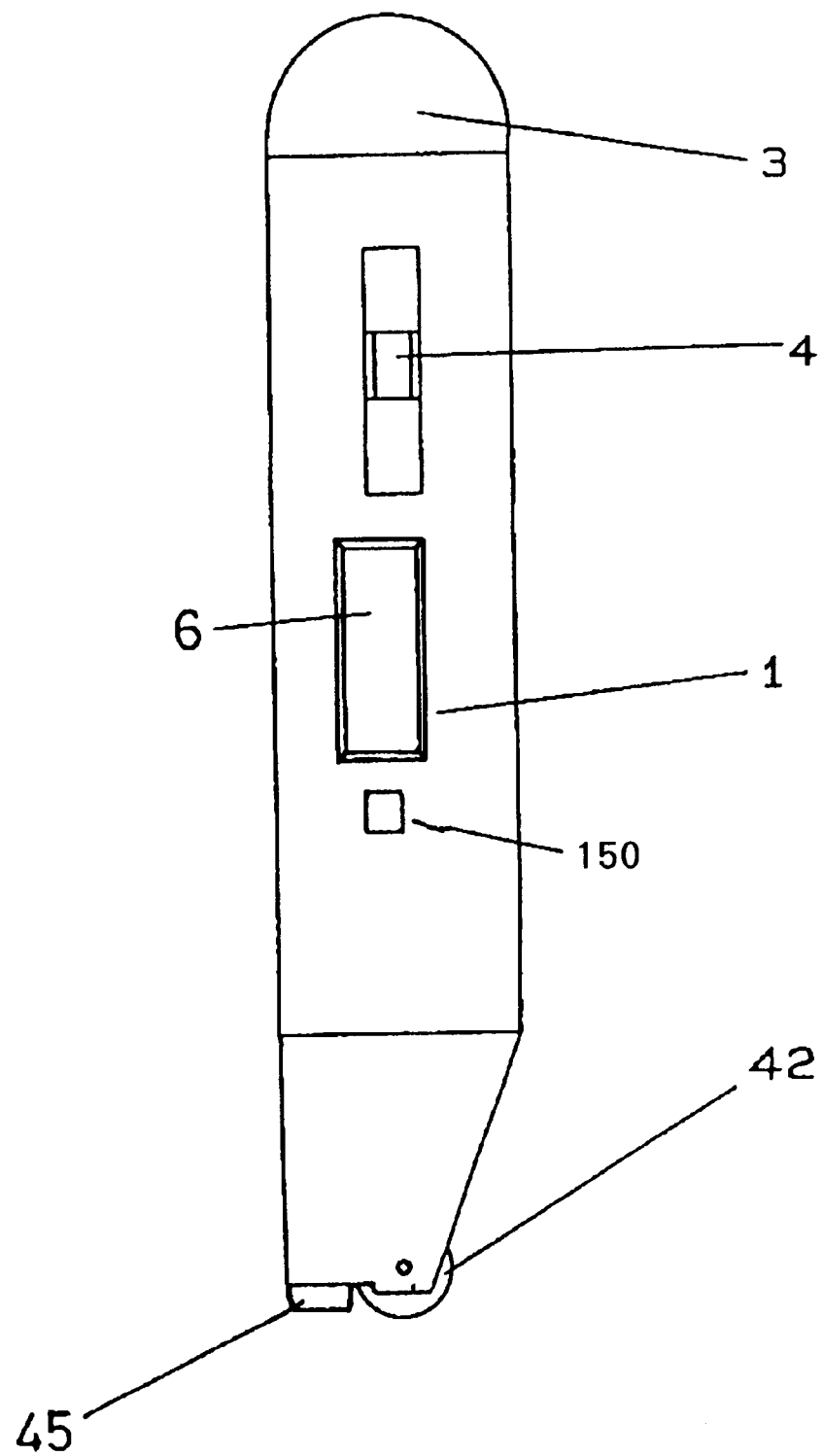
FIG. 1 is a side view showing an image forming device according to a first embodiment of the present invention.

An image forming device according to a preferred embodiment of the present invention will be described while referring to the accompanying drawings wherein like parts and components are designated by the same reference numerals to avoid duplicating description.

First, an image forming device according to a first embodiment of the present invention will be provided. FIG. 1 is a perspective view showing the image forming device according to the first embodiment of the present invention. A body 1 of the present image forming device is formed into a cylindrical shape so as to be easily held by a user. A roller 42 is rotatably disposed at a lower tip of the body 1. The surface of the roller 42 is covered with a resilient material such as rubber. An ink-jet print head 45 is disposed at the lower tip of the body to one side of the roller 42. An interface portion 3 used for infrared transmission of print data to and from an external device, such as a personal computer (not shown in the drawings), is provided at the upper tip of the body 1. Also, a mode switching switch 4, for switching operation modes of the image forming device between a data input mode and a print mode, is provided on the side of the body 1. A power source switch 150 is provided for turning ON and OFF the image forming device. A display 6 for displaying the print mode of the image forming device is provided on the side of the image forming device.

The image forming device of the present embodiment is for printing print data inputted from an external device onto a recording medium, such as paper. To perform printing, a user grasps the body 1 and brings the roller 42 into contact with the recording medium. The user then scans the device across the printing medium while contacting and rotating the roller 42 over the printing medium.

Figure 2:
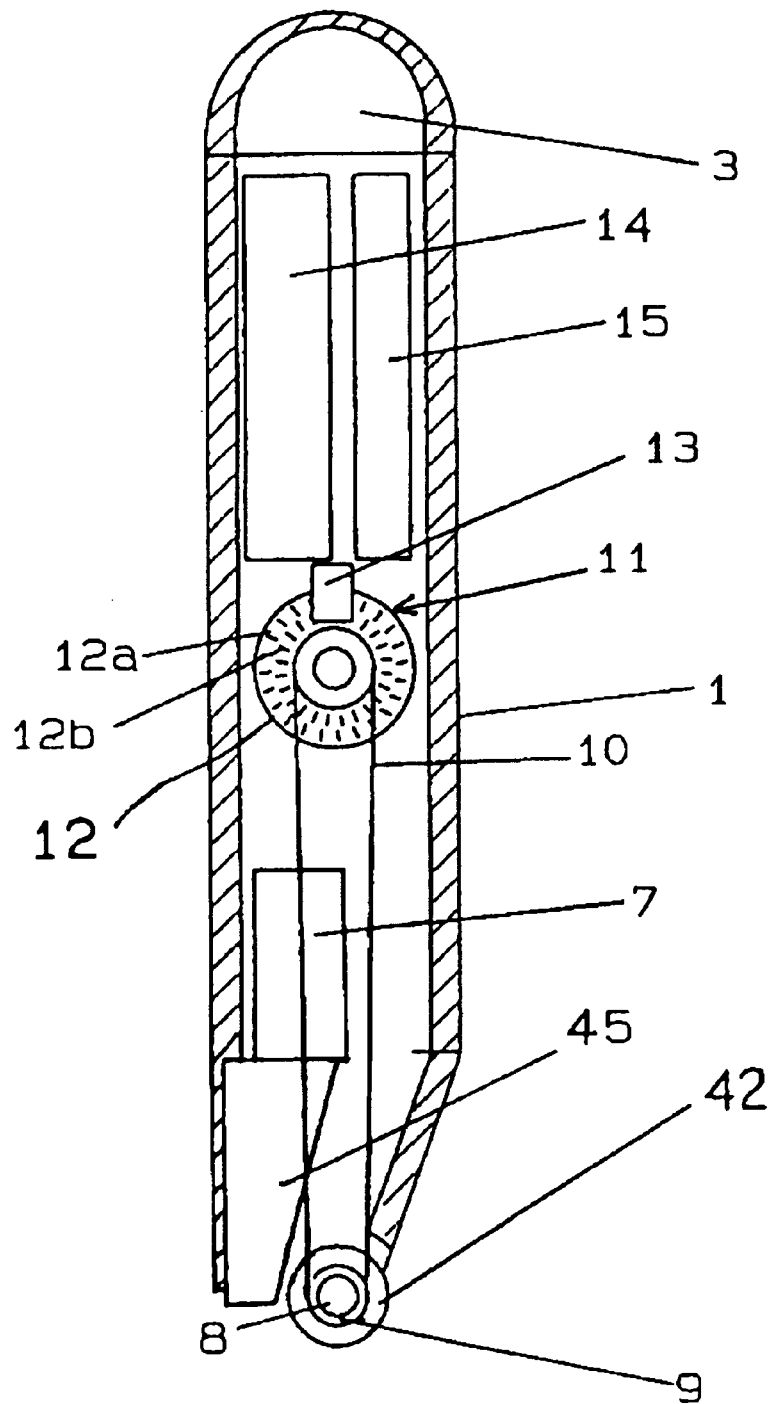
FIG. 2 is a cross-sectional view showing internal configuration of the image forming device.

FIG. 2 is a cross-sectional view showing internal configuration of the image forming device according to the present embodiment. The internal configuration of the image forming device according to the present embodiment will be explained in detail while referring to FIG. 2.

The roller 42 is disposed at the lower tip of the body 1 so as to be freely rotatable around a shaft 8. The ink-jet print head 45 is disposed at one side of the roller 42. The roller 42 maintains a fixed distance between the tip of the print head 45 and the recording medium.

An ink tank 7 for supplying ink to the ink-jet print head 45 is provided above the ink-jet print head 45. A pulley 9 is fixed to the shaft 8 of the roller 42 so as to rotate in association with rotation of the front roller 42. A belt 10 is suspended between the pulley 9 and a rotation disk 12 of an encoder 11, to be described later, so that rotational force generated by the pulley 9 in association with rotation of the front roller 42 is transmitted to the rotation disk 12 of the encoder 11. Slits 12a, 12b are formed in the periphery of the rotation disk 12 at predetermined intervals. The slits 12b are formed with a phase shift of 90° with respect to the slits 12a. A photointerrupter 13 is provided to the encoder 11. The photointerrupter 13 is turned ON and OFF by rotation of the slits 12a, 12b and converts rotational speed of the rotation disk 12 into electric pulse signals accordingly. The converted electric pulse signals are inputted to a control portion 14 provided in the body 1.

The control portion 14 is for receiving electric pulse signals outputted from the photointerrupter 13, and for controlling the ink-jet print head 45 and the interface portion 3. A power source 15 turned on and off by the power source switch 150 and for supplying power to various components of the image forming device is provided near the control portion 14. The power source 15 is configured from a power supplying portion, such as a small primary or secondary battery, and components for stabilizing power.

Next, an explanation will be provided for a detection method used by the encoder 11 to detect rotational amount and direction of the roller 42 when the image forming device of the present embodiment is scanned.

Figure 3:
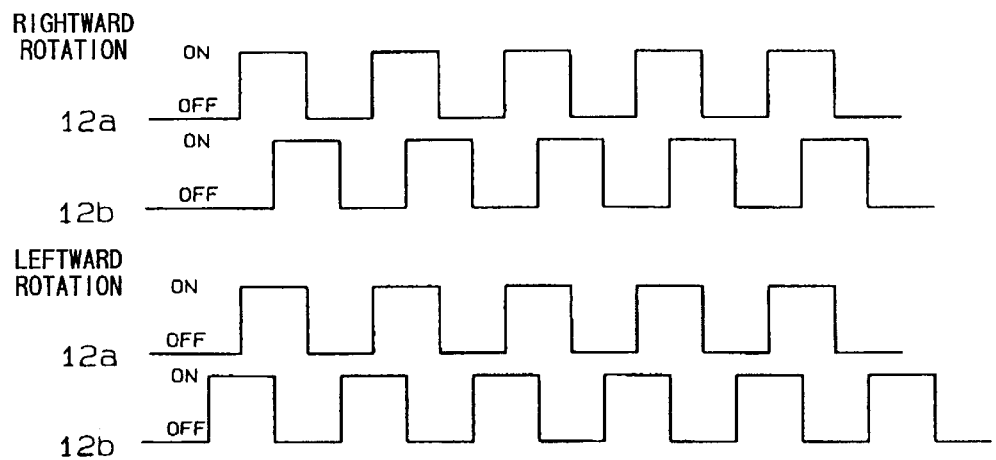
FIG. 3 is a timing chart showing processes for detecting movement amount and direction of the image forming device.

The roller 42 rotates when a user scans the image forming device across the recording medium. FIG. 3 shows the waveforms of signals outputted from the photointerrupter 13 when the roller 42 rotates in a rightward direction and in a leftward direction. When the roller 42 rotates in the rightward direction, the slit 12b produces a detection waveform having a phase shifted 90° behind the detection waveform produced by the slit 12a. When the roller 42 rotates in the leftward direction, the slit 12b produces a detection waveform having a phase shifted 90° ahead of the detection waveform produced by the slit 12a. Therefore, rotational direction of the roller 42 can be detected by detecting phase shift between the two waveforms. Further, movement amount of the image forming device can be determined by calculating the number of pulses of the detection waveforms from the photointerrupter 13.

Figure 4:
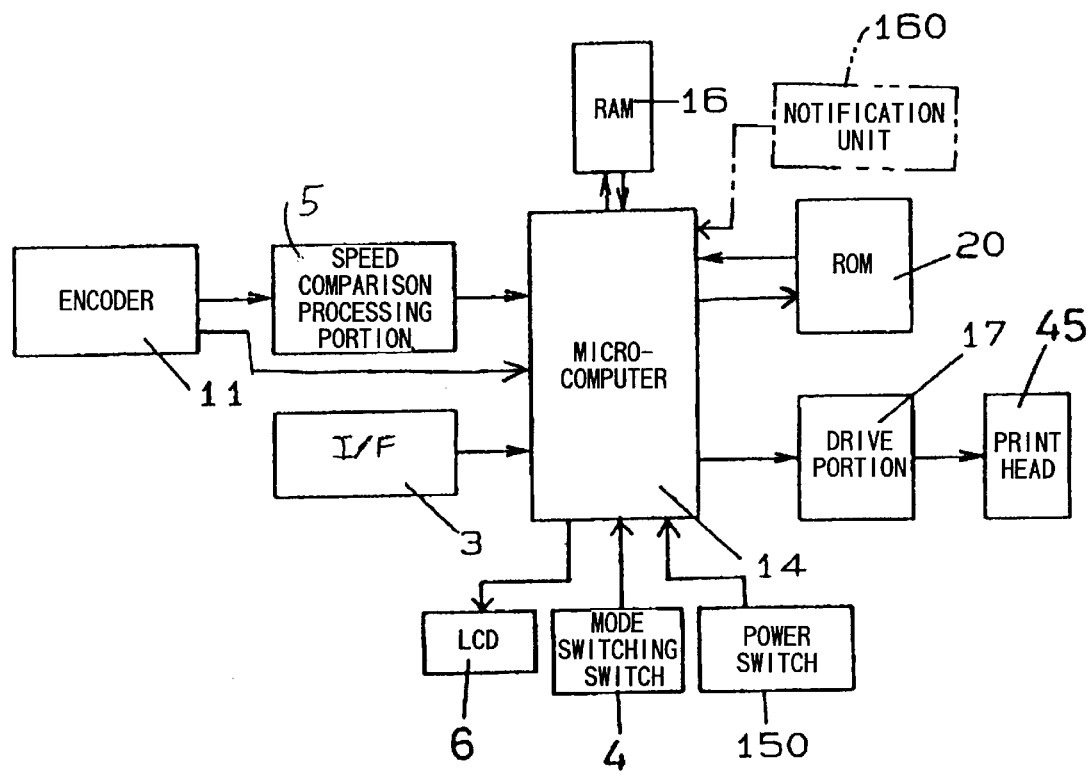
FIG. 4 is a block diagram showing electrical components of the image forming device.

FIG. 4 is a block diagram showing electrical configuration of the image forming device according to the present embodiment. As shown in FIG. 4, the control portion 14 is connected to: a memory device 20 such as a ROM storing control programs for controlling each electrical component based on a predetermined program; a memory portion 16 such as a RAM for storing print data inputted from the interface portion 3; and a drive portion 17 for driving the ink-jet print head 45. The interface portion 3 and the mode switching switch 4 are also connected to the control portion 14. Electric pulse signals, based on the rotational speed of the encoder 11, are inputted to the control portion 14 and also to a speed comparison processing portion 5, to be described later. Each electrical component is included in the body 1 of the manual-scanning type image forming device shown in FIG. 1.

Figure 5:
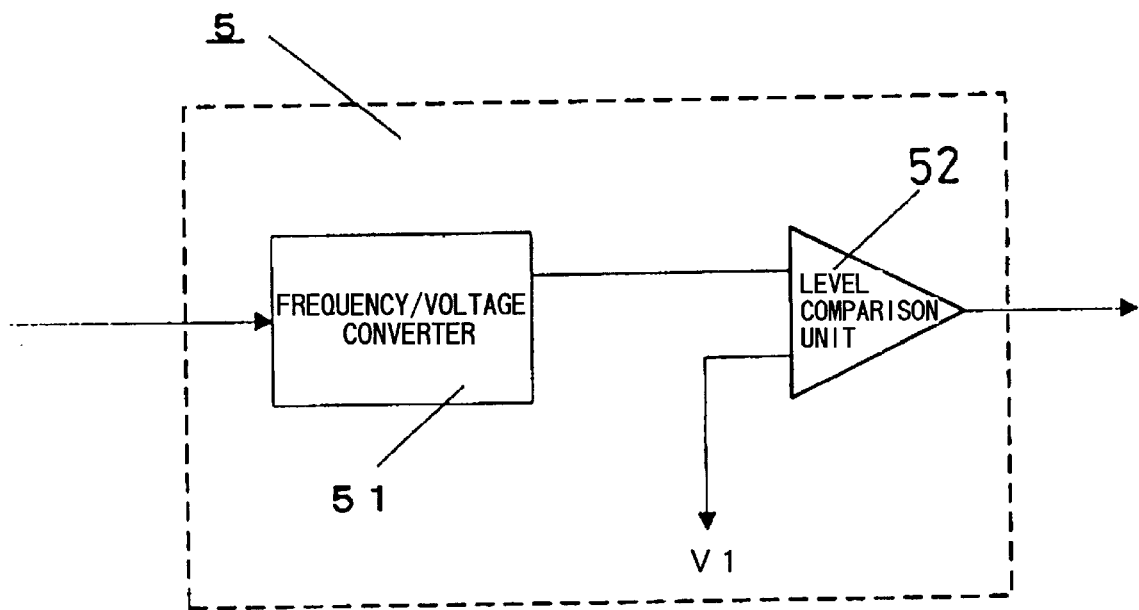
FIG. 5 is a block diagram showing electrical components of a speed comparison processing portion of the image forming device.

Next, configuration of the speed comparison processing portion 5 in the image forming device according to the present embodiment will be explained in detail while referring to FIG. 5.

The speed comparison processing portion 5 includes: a frequency-to-voltage converter 51 (referred to as the F/V converter 51 hereinafter); and a level comparison unit 52 connected to receive output from the F/V converter 51. The electric pulse signals shown in FIG. 3 are outputted from the encoder 11 and inputted to the F/V converter 51. The F/V converter 51 outputs, to the level comparison unit 52, a voltage V corresponding to the frequency of the inputted electric pulse signals. The level comparison unit 52 compares the outputted voltage with a reference voltage V1. The reference voltage V1 is a voltage value converted from a reference speed and preset in the level comparison unit 52.

The level comparison unit 52 is configured to output a high level signal when the voltage V is higher than the reference voltage V1, and to output a low level signal when the voltage V is lower than the reference voltage V1. Therefore, when the level comparison unit 52 outputs a high level signal, it can be determined that the present scanning speed of the image forming device exceeds the reference speed. Although it would be ideal to set the reference speed to correspond to the maximum drive frequency of the print head 45, the reference speed is actually set to less than the maximum drive frequency of the print head 45. This is because the performance of the print head 45 will degrade with use. That is, although the print head 45 is capable of operating at its maximum drive frequency when first used, the print head 45 will no longer be capable of operating at its maximum drive frequency after a certain amount of use. Therefore, if the device were configured so that the print head 45 is driven to operate at its maximum drive frequency when scanned at the reference speed, then after the print head 45 is used a certain amount, the print head 45 will be incapable of printing properly when scanned at the reference speed. This problem is prevented by setting the reference speed to less than the maximum drive frequency of the print head 45.

Figure 6:
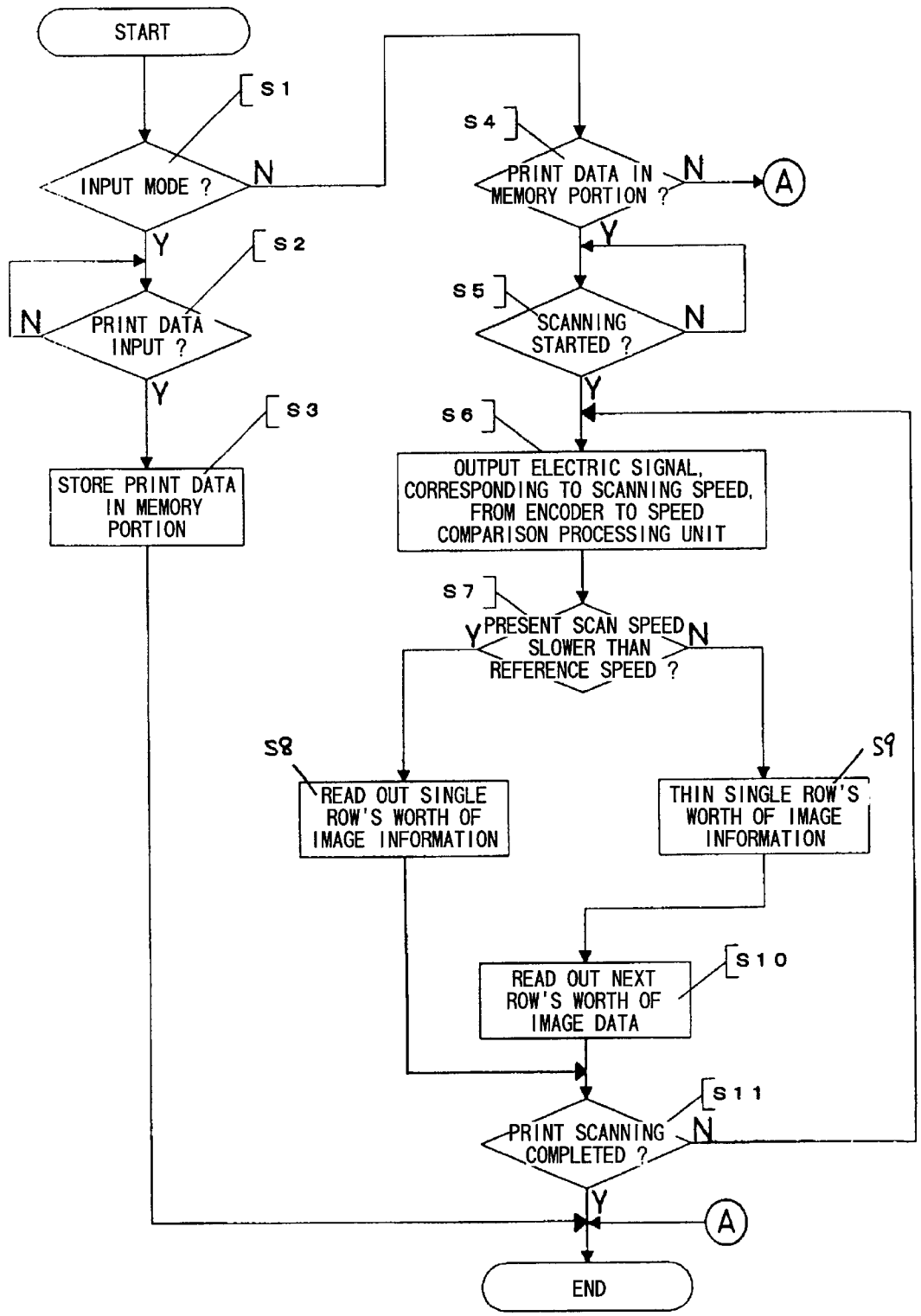
FIG. 6 is a flowchart showing printing control a operations of the image forming device.

While referring to the flowchart of FIG. 6, an explanation will be provided for operations of the image forming device of the first embodiment.

The image forming device according to the present embodiment operates based on predetermined programs stored in the memory device 20. First, whether or not the switch 4 is set to an input mode is determined in S1. If so (S1:YES), then in S2 the control portion 14 awaits print data to be inputted to the interface portion 3 from the external device using infrared signals. When the control portion 14 detects input of the print data (S2:YES), then in S3 the print data is temporarily stored in the memory portion 16. Before the print data inputted from the external device is stored in the memory portion 16, it is desirable to convert the print data into a format easily used by the control portion 14 to print using the ink-jet print head 45. By converting the print data before storing it in the memory portion 16, the burden placed on the control portion 14 during a print mode, to be described later, can be lightened.

Next, when the user uses the switch 4 to select the print mode (S1:NO), then in S4 the control portion 14 determines whether or not print data is already stored in the memory portion 16. If the control portion 14 determines that print data is not stored in the memory portion 16 (S4:NO), then the following processes are terminated. On the other hand, when print data is already stored in the memory portion 16, then in S5 the control portion 14 waits for the user to grasp and scan the device to print on the recording medium.

When the user starts scanning the device, in S6 the encoder 11 generates an electric pulse signal corresponding to the scanning speed and the electric pulse signal is inputted to the speed comparison processing portion 5. In S7, the control portion 14 determines, based on the comparison signal from the speed comparison processing portion 5, whether or not the image forming device is being scanned slower than the reference speed. When the scanning speed is slower than the reference speed, that is, when the comparison signal is a low level (S7:YES), then in S8 the control portion 14, in synchronization with pulses generated by the encoder 11, serially reads out image information stored the memory portion 16 and transmits the image information to the drive portion 17. Also, in S8, the control portion 14 controls the display 6 to display that the device is presently in its normal printing mode.

On the other hand, when the scanning speed is faster than the reference speed, that is, when the comparison signal is a high level (S7:NO), then in S9 the control portion 14 skips, that is, thins, image information equivalent to the number of nozzles, that is, the number in the line of nozzles provided on the ink-jet print head 45. Also, in S9, the control portion 14 controls the display 6 to display that the device is presently in its draft mode. Then, in S10 the control portion 14, in synchronization with every other pulse generated in the encoder 11, reads out the next row's worth of image information and transmits it to the drive portion 17. The drive portion 17 drives the ink-jet print head 45 to print the image information transmitted by the control portion 14. Said differently, in S7 through S10, the control portion 14 controls the drive portion 17 and the print head 45 to print the image in a density dependent on whether the speed comparison processing portion 5 determines that the movement speed of the device is faster or slower than the reference speed. The above-described processes from S6 to S10 are repeated until print scanning operations of the present device are completed (S11:YES).

As described in detail above, with the image forming device of the present invention, the user does not have to stop scanning, but can continue printing operations, even when the user scans the device faster than the maximum drive frequency of the ink-jet print head 45. Also, the resultant printing quality is excellent.

Next, an explanation will be provided for a modification of the speed comparison processing portion 5.

Figure 7:
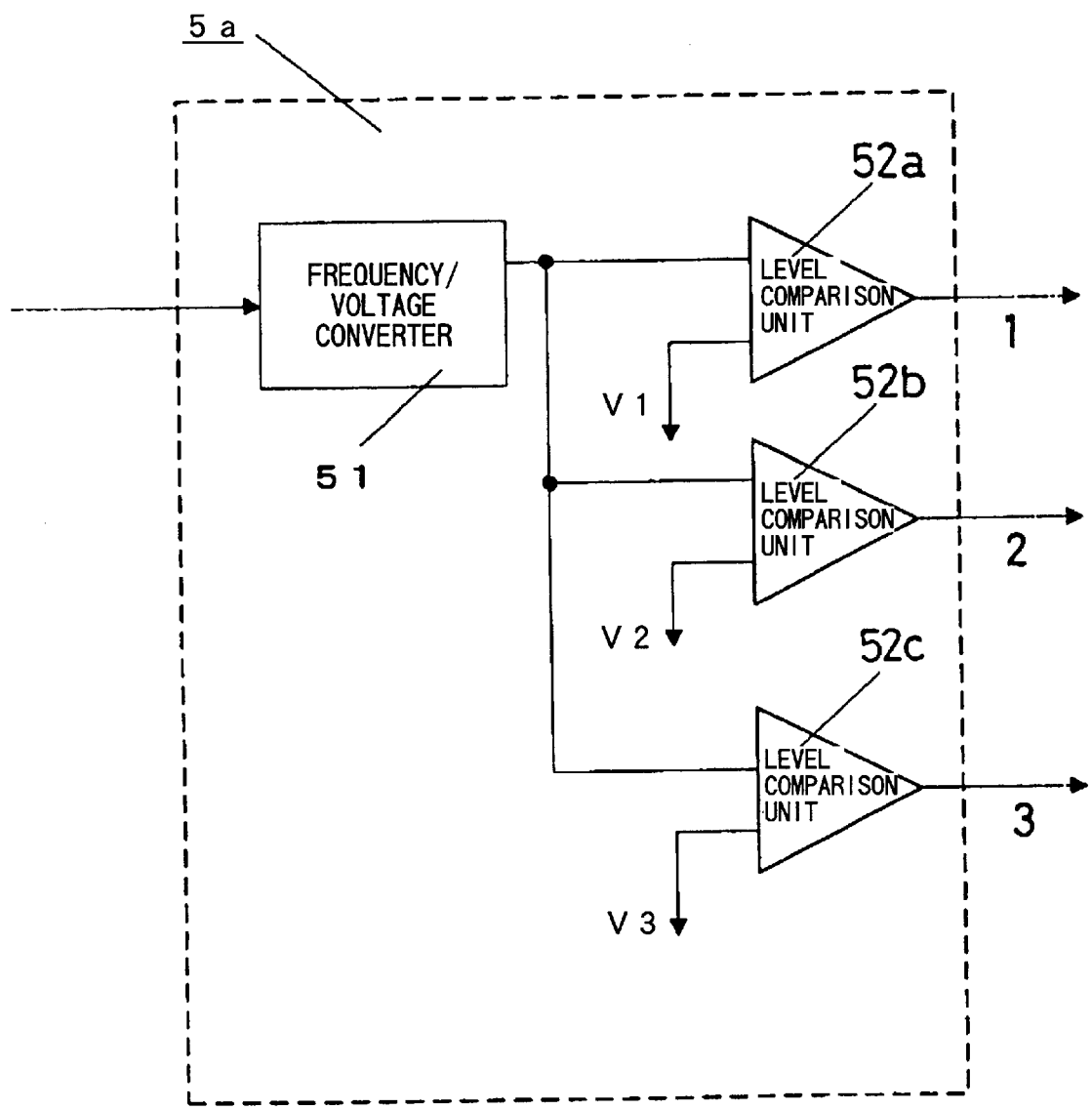
FIG. 7 is a block diagram showing electrical configuration of a speed comparison processing portion of an image forming device according to a modification of the first embodiment.
Figure 8:
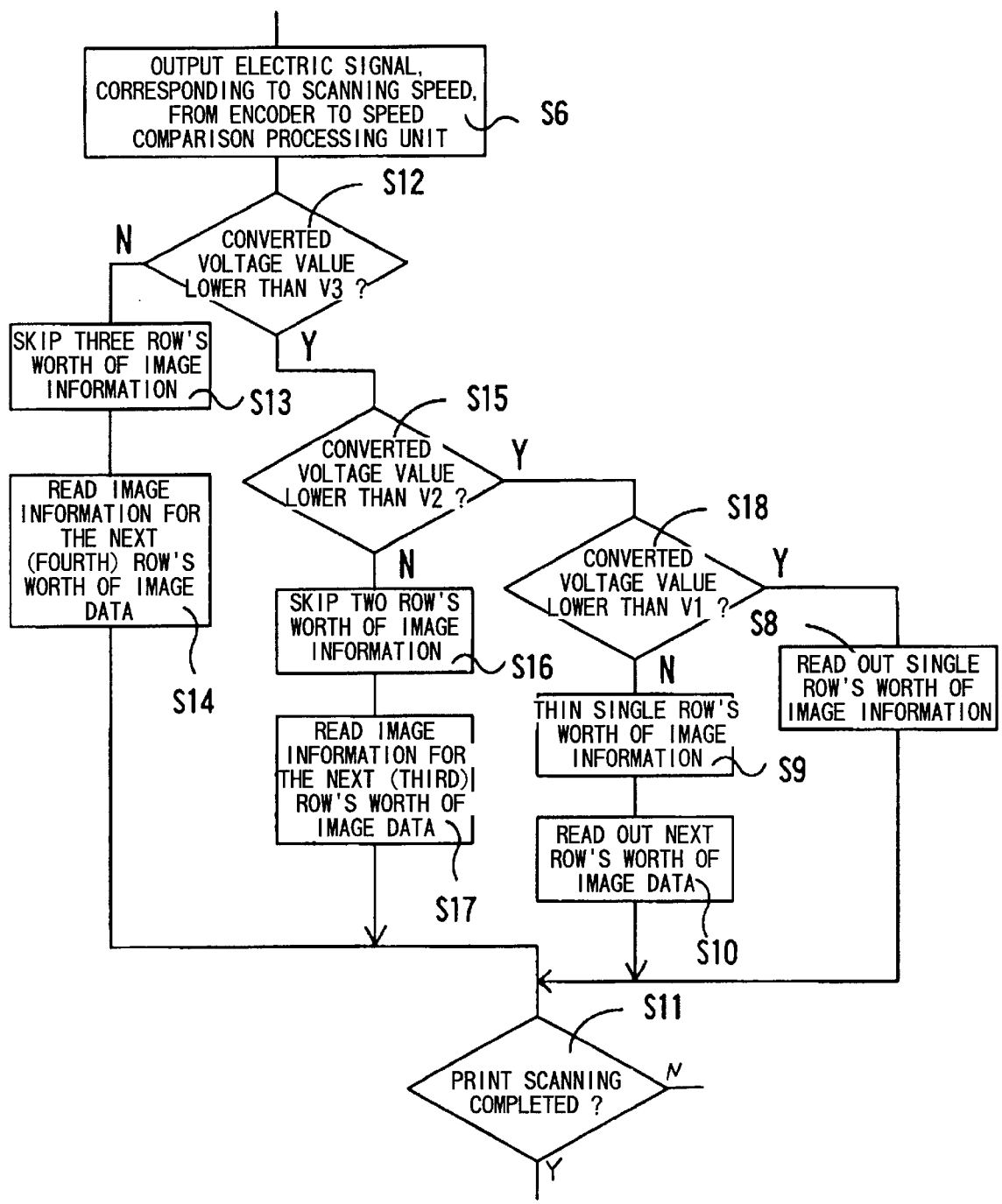
FIG. 8 is a flowchart showing printing control operations of an image forming device according to the modification of the first embodiment.

As shown in FIG. 7, the speed comparison processing portion 5a includes: a F/V converter 51; and three level comparison devices 52a, 52b, 52c each connected to receive output of voltage value from the F/V converter 51. Each of the level comparison devices 52a to 52c compares the voltage value from the F/V converter 51 with its reference voltage V1, V2, V3 respectively. It should be noted that the reference voltage V1 is smaller than the reference voltage V2, which is smaller than the reference voltage V3 (i.e. V1<V2<V3). Operations of an image forming device having the above-described configuration will be explained while referring the flowchart in FIG. 8. It should be noted that explanation for steps the same as in the flowchart in FIG. 6 will be omitted.

When the user starts scanning the device, then in S6 the encoder 11 generates an electric signal corresponding to the scanning speed and the electric signal is inputted to the speed comparison processing portion 5a. In S12, the level comparison device 52a compares the voltage value from the F/V converter 51 with the reference voltage V3. If the voltage value from the speed comparison processing portion 5 is not lower than the reference voltage V3 (S12:NO), then it can be understood that the present scanning speed is extremely fast so that, in S13, the control portion 14 skips, that is, thins, image information corresponding to three rows' worth of the nozzles provided on the ink-jet print head 45. In S14, in synchronization with every fourth pulse generated in the encoder 11, the control portion 14 reads out the image information for the fourth row's worth of image information and transmits it to the drive portion 17.

On the other hand, when the voltage value from the F/V converter 51 is lower than the reference voltage V3, then in S15, it is determined whether or not the voltage value from the F/V converter 5a is lower than the voltage V2. If the voltage value is higher than the reference voltage V2 (S12:YES, S15:NO), then it is determined that the scanning speed is quite fast so that, in S16, the control portion 14 skips, that is, thins, image information equivalent to two lines of nozzles provided on the ink-jet print head 45. In S17, in synchronization with every third pulse generated in the encoder 11, the control portion 14 reads out the image information for the third row and transmits it to the drive portion 17. When the voltage value corresponding to the scanning speed is smaller than the reference voltage V2 (S15:YES), then in S18, whether or not the voltage value from the F/V converter 51 is less than the reference voltage V1 is determined. Than, the above-described operations of S8, or S9 and S10, are executed depending on the determination of S18.

In this way, by setting a plurality of reference speeds, the control portion 14 can perform thinning operations in closer accordance with the scanning speed so that printing is properly performed in correspondence with a wide range of scanning speeds. Also, by setting the reference speeds to correspond to integral multiples of the maximum drive frequency of the ink-jet print head 45, then the amounts of image information thinned in the memory portion 16 in S9, S14, and S17 can be set to multiples of the number of nozzles provided to the ink-jet print head 45. Said differently, in S8 through S10 and S12 through 18, the control portion 14 controls the drive portion 17 and the print head 45 to print the image in a density dependent on whether the speed comparison processing portion 5a determines that the movement speed of the device is faster or slower than the reference speeds.

Figure 9:
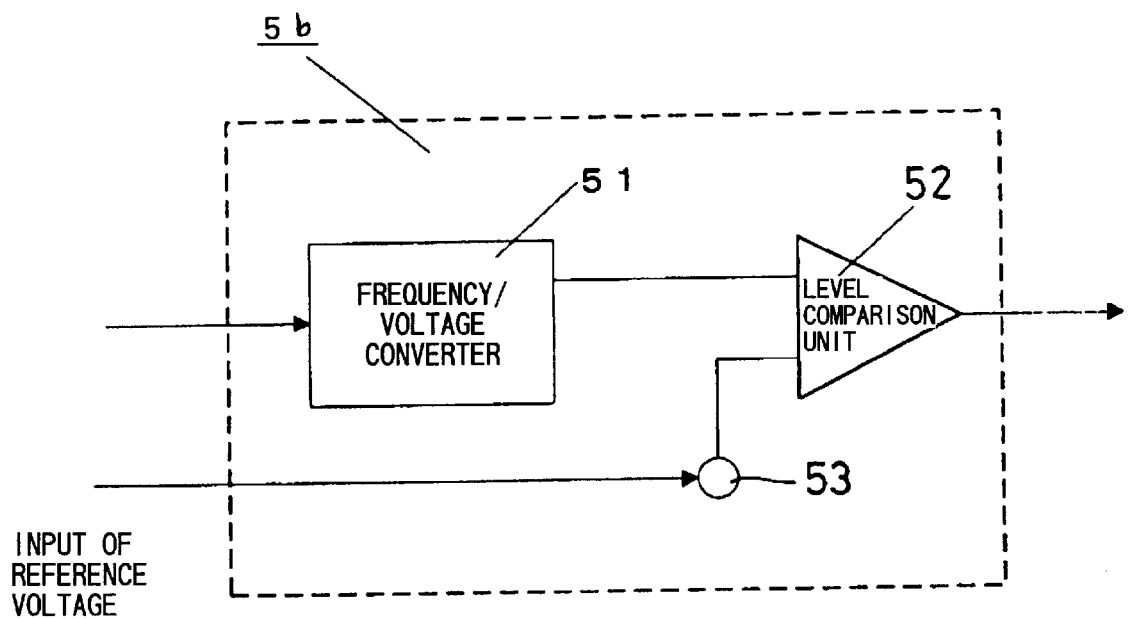
FIG. 9 is a block diagram showing electrical configuration of a speed comparison processing portion of an image forming device according to another modification of the first embodiment.

Further, as shown in FIG. 9, the image forming device can be provided with a speed comparison processing portion 5b having a reference voltage adjustment portion 53 for changing the reference voltage. In this case, by merely changing the scanning speed of the device, the user can switch print modes between: a normal mode wherein normal printing is performed when the scanning speed is slower than the reference speed; and a draft mode wherein thinned printing is performed when the scanning speed is faster than the reference speed.

Figure 10:
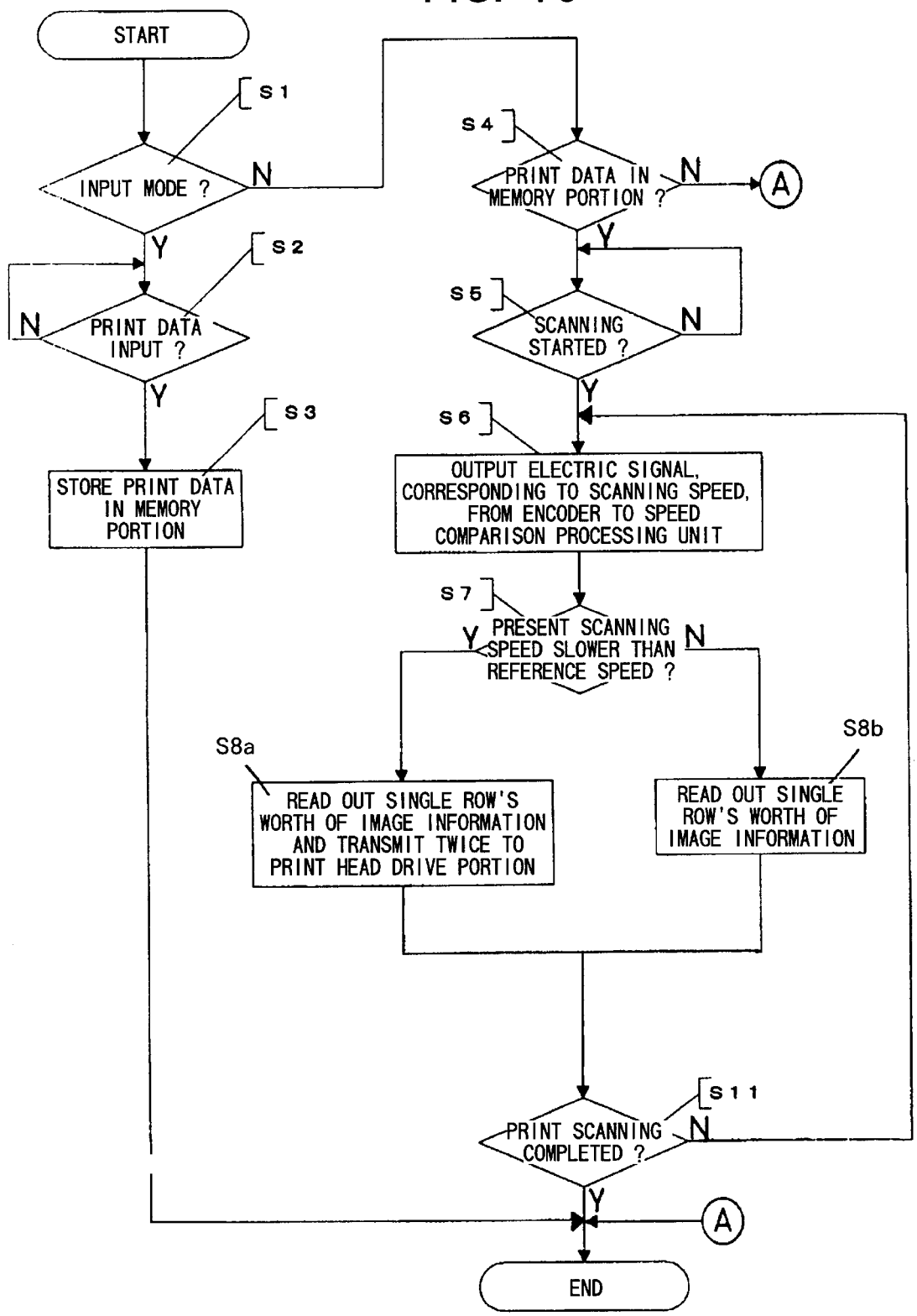
FIG. 10 is a flowchart showing printing control operations of an image forming device according to a second embodiment of the present invention.

Next, an image forming device according to a second embodiment of the present invention will be provided. The configuration of the image forming device of the second embodiment is similar to that of the first embodiment. However, in the second embodiment, the standard speed is set to the ideal speed of equal to or less than half of the maximum drive frequency (speed) of the ink-jet print head 45. Also, the image forming device of the second embodiment differs from the image forming device of the first embodiment in the processes performed during control of printing operations. As shown in FIG. 10, when the present scanning speed of the image forming device is slower than the reference speed, so that the comparison signal from the speed comparison processing portion 5 is a low level (S7:YES), then in S8a, the control portion 14 serially reads out one row's worth of image information from the memory portion 16 and transmits the same information twice to the drive portion 17 of the print head 45. Also, in S8a, the control portion 14 controls the display 6 to display that the device is presently in its bold print mode. Because the drive portion 17 drives the print head 45 according to information transmitted by the control portion 14, each pixel is printed twice when the image forming device is scanned slower than the reference speed.

Figure 11:
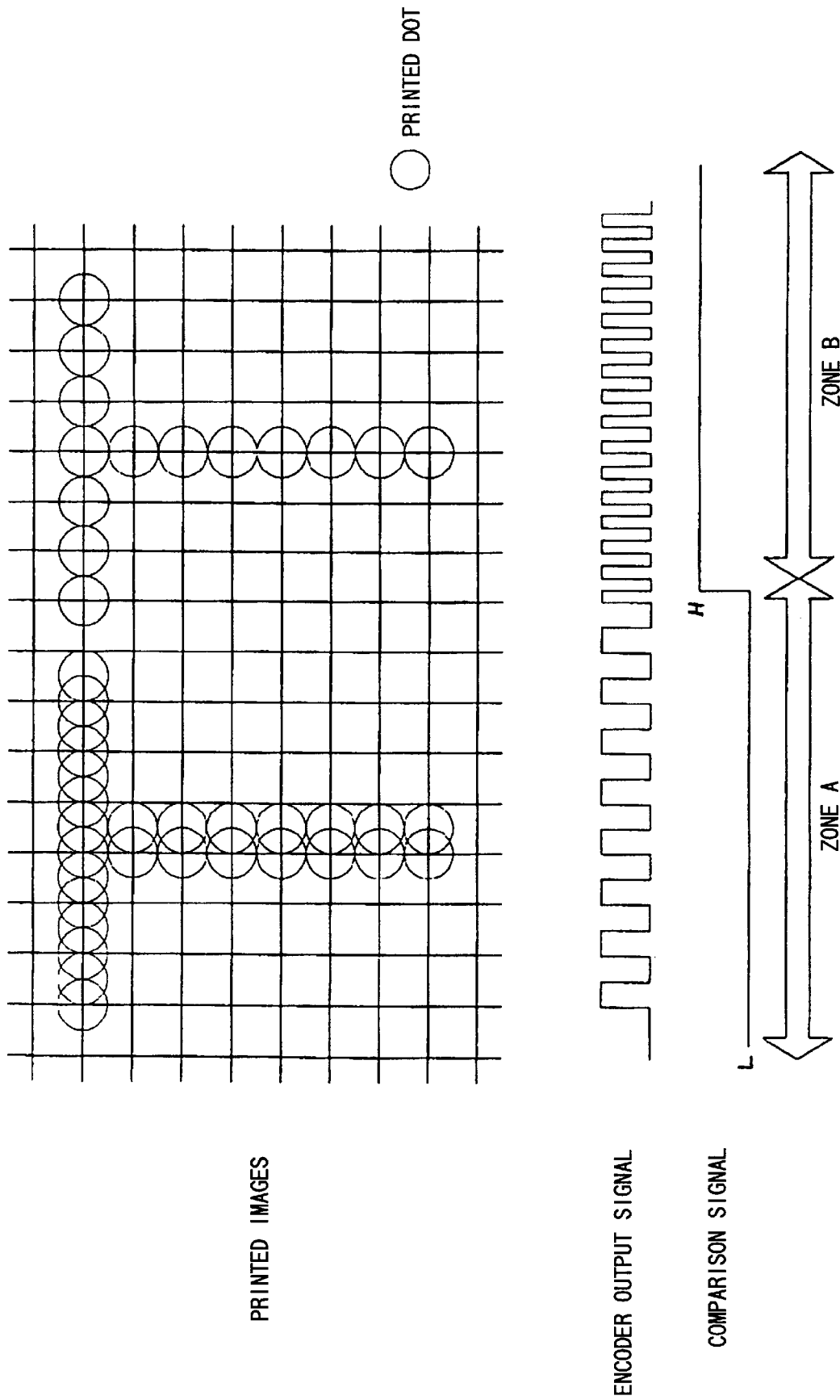
FIG. 11 is a magnified view showing an image printed by the image forming device of the second embodiment and relationship of the image to a signal outputted by an encoder of the image forming device.

On the other hand, when the present scanning speed of the image forming device exceeds the reference speed, so that the comparison signal from the speed comparison processing portion 5 is a high level (S7:NO), then in S8b, the control portion 14 serially reads out a single row's worth of image information from the memory portion 16 and transmits it only a single time to the drive portion 17 of the print head 45. Also, in S8b, the control portion 14 controls the display 6 to display that the device is presently in its normal printing mode. Because the drive portion 17 drives the print head 45 according to information transmitted by the control portion 14, each pixel is printed once when the image forming device is scanned faster than the reference speed FIG. 11 shows "T" images printed as a result of S8a and S8b. In this example, the image forming device was scanned faster than the reference speed while in zone A and slower than the reference speed while in zone B. As can be seen, each pixel is printed twice in the A zone while each pixel is printed only once in the B zone.

Said differently, in S8a and S8b, the control portion 14 controls the drive portion 17 and the print head 45 to print the image in a density dependent on whether the speed comparison processing portion determines, in S7, that the movement speed of the device is faster or slower than the reference speed. In this way, a user can print normal images, or more dense and thicker images, depending on how fast he or she scans the image forming device. By merely scanning the device slower than the standard speed, the user can print images denser and thicker than during normal printing.

Also, because the standard speed of the image forming device of the present invention is set to equal to or less than half of the maximum drive frequency of the ink-jet print head 45, printing requirements will not exceed the maximum drive frequency of the ink-jet print head 45 even when printing is performed twice for each pixel. Therefore, proper printing can be easily performed without interruption.

It should be noted that although the second embodiment describes each pixel as being printed twice when the image forming device is scanned Blower than the reference speed, each pixel can be printed three times or more. However, when the number of times each pixel is printed is increased, the reference speed should be set so as not to exceed a speed determined by dividing the maximum drive frequency of the ink-jet print head 45 with the number of times each pixel will be printed.

It should be noted that the image forming device of the second embodiment can be provided with the speed comparison processing portion 8a shown in FIG. 9 so that the reference speed is changeable. Therefore, the user can set the standard speed to a speed he or she desires. The maximum standard speed settable using the speed comparison processing unit 5a should be set to less than half of the maximum drive frequency of the ink-jet print head 45.

Next, an explanation for an image forming device according to a third embodiment of the present invention will be provided. The image forming device of the third embodiment is capable of printing in both the draft mode described in the first embodiment and in the bold print mode described the second embodiment.

Figure 12:
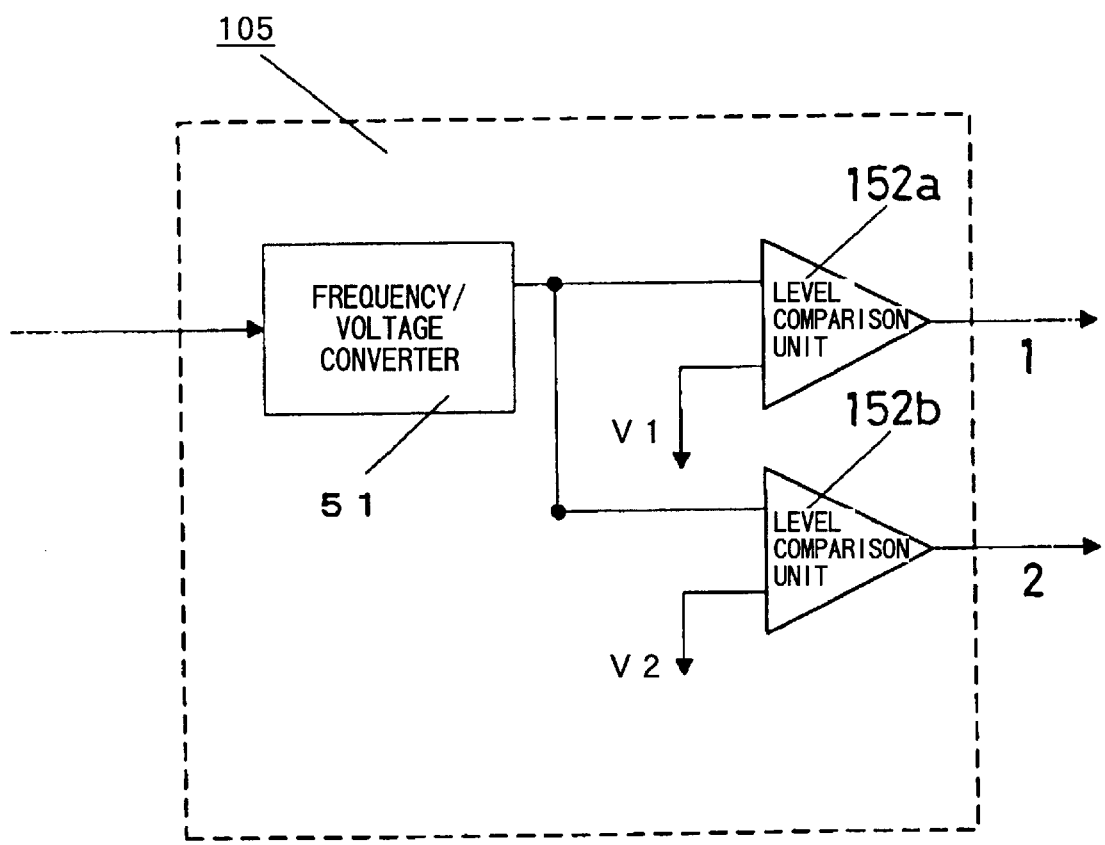
FIG. 12 is a block diagram showing electrical configuration of a speed comparison processing portion of the image forming device according to a third embodiment of the present invention.

The image forming device of the third embodiment includes the speed comparison processing portion 105 shown in FIG. 12. The speed comparison processing portion 105 includes; the F/V converter 51; and two level comparison units 152a and 152b, both connected to receive output voltage from the F/V converter 51.

Figure 13:
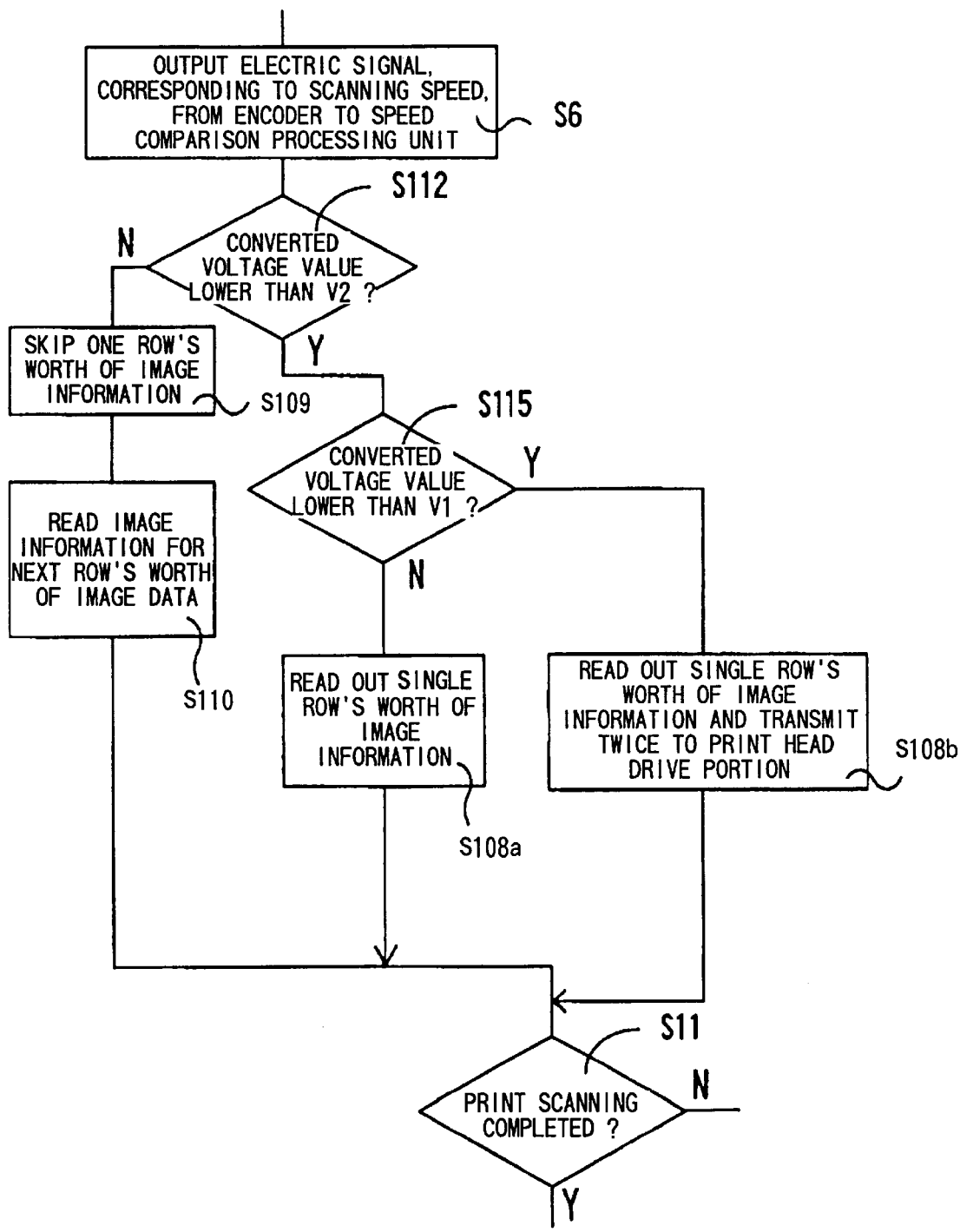
FIG. 13 is a flowchart showing printing control operations of an image forming device according to the third embodiment.

Operations of the image forming the device of the third embodiment will be described while referring to the flowchart in FIG. 13. Processes the same as those described in the first and second embodiments are referred to by the same numbers and their explanation will be omitted to avoid duplication of description.

After the speed comparison processing portion 105 receives the electric signal from the encoder 11 then, in S6, the resultant voltage value from the F/V converter 51 is compared with the voltage value V2 in the level comparison unit 152a and, in S112, whether or not the voltage value from the F/V converter 51 is lower than the voltage value V2 is determined. If not (S112:NO), then it is assumed that the image forming unit is being scanned at a fast speed so the user wishes to print the image in the draft mode. Therefore, in S109 one row's worth of image information stored in the memory portion 16 is skipped and in S110 image information for the next row's worth of image information is read out of the memory portion 16 and transmitted to the drive portion 17. Also, in S109, the display 6 is controlled to display that the device is presently in its draft mode.

If it is determined that the voltage value from the F/V converter 51 is lower than the voltage value V2 (S112:YES), then, in S115, the voltage value from the F/V converter 51 is compared with the voltage value V1 in the level comparison unit 152b and whether or not the voltage value from the F/V converter 51 is lower than the voltage value V1 is determined. If not (S115:NO), then it is assumed that the image forming unit is being scanned at a normal speed so the user wishes to print the image in the normal print mode. Therefore, in S108a one row's worth of image information stored in the memory portion 16 is read out of the memory portion 16 and transmitted to the drive portion 17. Also, in S108a, the display 6 is controlled to display that the device is presently in its normal print mode.

When the voltage value from the F/V converter 51 is lower than the voltage value V1 (S115:YES), then it is assumed that the image forming unit is being scanned at a slow speed so the user wishes to print the image in the bold print mode. Therefore, in S108b one row's worth of image information stored in the memory portion 16 is read out of the memory portion 16 and transmitted twice to the drive portion 17. Also in S108b, the display 6 is controlled to display that the device is presently in its bold print mode.

With this configuration, the user can select between the draft mode, the normal print mode, and the bold print mode merely by changing speed at which he or she scans the image forming device across the recording medium. Said differently, in S108, S108', S109, S110, S112, and S115, the control portion 14 controls the drive portion 17 and the print head 45 to print the image in a density dependent on whether the speed comparison processing portion determines that the movement speed of the device is faster or slower than the reference speed.

While the invention has been described in detail with reference to specific embodiments thereof, it would be apparent to those skilled in the art that various changes and modifications may be made therein without departing from the spirit of the invention, the scope of which is defined by the attached claims.

For example, in the above-described embodiments, images are printed at different densities by the control portion processing the pixels of the image, that is, either to thin the number of pixels before printing or to print each pixel a plurality of times. However, the density of images can be adjusted in other manners in accordance with whether the movement speed of the device is faster or slower than a reference speed. For example, images can be printed thick and bold by controlling the ink-jet print head 45 to eject a larger volume ink droplet to produce for each dot. Also, images can be printed during the draft mode by controlling the ink print head 45 to eject a smaller volume ink droplet to produce each dot.

Also, as shown in FIG. 4, any of the image forming devices according to the above-described embodiments can be further provided with a notification unit 160 for advising the user that the print mode of the device has switched because of a change in the movement speed of the device. For example, a warning buzzer can be provided for audibly notifying the user that the print mode of the device has changed. Alternatively, a light source can be provided for emitting light to visually notify the user that the print mode of the device has changed.

What is claimed is:

1. An image forming device comprising:
   a recording unit including a plurality of dot forming elements that prints an image on a recording medium;
   a memory unit that stores image information for pixels forming the image;
   a speed detection unit that detects movement speed of the recording unit;
   a speed comparison unit that compares the movement speed detected by the speed detection unit with a preset reference speed to determine whether the movement speed is faster or slower than the reference speed; and
   a control unit that controls drive of the recording unit in synchronization with the movement speed detected by the speed detection unit to print the image based on the image information stored in the memory units, and that performs processes so that the recording unit prints the image in a density dependent on whether the speed comparison unit determines that the movement speed is faster or slower than the reference speed,
   wherein the control unit reads out image information stored in the memory unit and transmits the image information at least once as is to the recording unit when the speed comparison unit determines that the movement speed is slower than the reference speed.

2. An image forming device as claimed in claim 1, wherein the control unit, when the speed comparison unit determines that the movement speed is faster than the reference speed, thins the image information stored in the memory unit before transmitting the image information to the recording unit.

3. An image forming device as claimed in claim 2, wherein the reference speed is set to equal to or less than a maximum drive frequency of the recording unit.

4. An image forming device as claimed in claim 3, wherein:
   the speed comparison unit compares the movement speed with a plurality of different reference speeds: and
   the control unit thins the image information at a ratio depending on results of the comparison unit comparing the movement speed with the plurality of reference speeds.

5. An image forming device as claimed in claim 4, further comprising a reference speed setting unit for optionally setting the reference speeds used by the speed comparison unit.

6. An image forming device as claimed in claim 3, further comprising a reference speed setting unit for optionally setting the reference speed used by the speed comparison unit to equal to or less than the maximum drive frequency of the recording unit.

7. An image forming device as claimed in claim 2, further comprising a reference speed setting unit for optionally setting the reference speed used by the speed comparison unit.

8. An image forming device as claimed in claim 2, further comprising a display for displaying that the image forming device is in a normal print mode when the speed comparison unit determines that the movement speed is slower than the reference speed and that the image forming device is in a draft mode when the speed comparison unit determines that the movement speed is faster than the reference speed.

9. An image forming device as claimed in claim 2, further comprising a notification unit which, when the speed comparison unit determines that the movement speed is faster than the reference speed, notifies a user that the movement speed is faster than the reference speed.

10. An image forming device as claimed in claim 9, wherein the notification unit audibly notifies the user by producing a sound.

11. An image forming device as claimed in claim 9, wherein the notification unit visually notifies the user by emitting light.

12. An image forming device as claimed in claim 1, wherein the control unit controls the recording unit to print the image denser when the comparison unit determines the movement speed to be slower than the reference speed than when the comparison unit determines the movement speed to be faster than the reference speed.

13. An image forming device as claimed in claim 12, wherein:
   the image is formed from a plurality of pixels; and
   the control unit reads out image information stored in the memory unit, transmits the image information a plurality of times as is to the recording unit, and controls the recording unit to print each pixel a plurality of times based on the image information when the speed comparison unit determines that the movement speed is slower than the reference speed.

14. An image forming device as claimed in claim 13, wherein the reference speed is set to a speed equal to or less than a maximum drive speed of the recording unit divided by the plurality of times each pixel is printed.

15. An image forming device as claimed in claim 12, wherein:
   the recording unit includes an ink jet print head for printing the image by ejecting ink droplets onto the recording medium; and
   the control unit controls the recording unit to eject each droplet in a larger volume when the speed comparison unit determines that the movement speed is slower than the reference speed than when the speed comparison unit determines that the movement speed is faster than the reference speed.

16. An image forming device as claimed in claim 12, further comprising a reference speed setting unit for optionally setting the reference speed used by the speed comparison unit.

17. An image forming device as claimed in claim 12, further comprising a display for displaying that the image forming device is in a normal print mode when the speed comparison unit determines that the movement speed is faster than the reference speed and that the image forming device is in a bold print mode when the speed comparison unit determines that the movement speed is slower than the reference speed.

18. An image forming device as claimed in claim 12, further comprising a notification unit which, when the speed comparison unit determines that the movement speed is slower than the reference speed, notifies a user that the movement speed is slower than the reference speed.

19. An image forming device as claimed in claim 18, wherein the notification unit audibly notifies the user by producing a sound.

20. An image forming device as claimed in claim 18, wherein the notification unit visually notifies the user by emitting light.

21. An image forming device as claimed in claim 1, wherein the speed comparison unit compares the movement speed detected by the speed detection unit with a first and a second reference speeds, the first reference speed being faster than the second reference speed, and wherein the control unit:

> when the speed comparison unit determines that the movement speed is faster than the first reference speed, thins the image information stored in the memory unit before controlling drive of the recording unit to print the image information;
>
> when the speed comparison unit determines that the movement speed is slower than the first reference speed and faster than the second reference speed, reads out image information stored in the memory unit and transmits the image information at least once as is to the recording unit, thereby controlling drive of the recording unit to print the image information without thinning the image information; and
>
> when the speed comparison unit determines that the movement speed is slower than the second reference speed, controls the recording unit to print the image denser than when the speed comparison unit determines that the movement speed is slower than the first reference speed and faster than the second reference speed.

22. The image forming device of claim 1, wherein said image forming device comprises a hand-held, manually-scannable ink jet printing apparatus.

23. The image forming device of claim 1, further comprising an interface portion coupled to said memory unit, for receiving said image via infrared signals externally input to said device.

24. An image forming device comprising:

> a recording unit including a plurality of dot forming elements that prints an image on a recording medium;
>
> a memory unit that stores image information for pixels forming the image;
>
> a speed detection unit that detects movement speed of the recording unit;
>
> a speed comparison unit that compares the movement speed detected by the speed detection unit with a preset reference speed to determine whether the movement speed is faster or slower than the reference speed; and
>
> a control unit that reads out image information stored in the memory unit and transmits the image information as is to the recording unit after the speed comparison determines whether the movement speed is faster or slower than the reference speed.

* * * * *